United States Patent [19]

Stella

[11] 4,134,245
[45] Jan. 16, 1979

[54] PACKAGING MACHINE

[75] Inventor: Ejidio Stella, Vicenze, Italy

[73] Assignee: FMC Corporation, San Jose, Calif.

[21] Appl. No.: 766,644

[22] Filed: Feb. 8, 1977

[51] Int. Cl.² .................. B65B 9/06; B65B 51/14; B65B 61/14
[52] U.S. Cl. .................................. 53/547; 53/134; 53/559
[58] Field of Search ............ 53/180 R, 180 M, 182 R, 53/182 M; 156/498, 515, 583

[56] References Cited

U.S. PATENT DOCUMENTS

| | | | |
|---|---|---|---|
| 2,292,295 | 8/1942 | Royal | 53/180 R |
| 2,837,883 | 6/1958 | Bracey | 53/182 M |
| 2,982,066 | 5/1961 | Thompson | 53/180 R |
| 3,272,674 | 9/1966 | Sachs et al. | 156/498 X |
| 3,438,173 | 4/1969 | Omori | 53/182 R |
| 3,564,810 | 2/1971 | Faletti et al. | 53/182 R |
| 3,732,661 | 5/1973 | Goldberger et al. | 53/134 |
| 3,738,081 | 6/1973 | Heinzer | 53/180 R |
| 3,740,300 | 6/1973 | Heinzer | 53/180 R |
| 3,874,976 | 4/1975 | MacFarland | 156/515 |
| 4,031,815 | 6/1977 | Verbeke | 156/515 X |

FOREIGN PATENT DOCUMENTS

2224726 12/1972 Fed. Rep. of Germany ........ 53/182 R
2400355 8/1974 Fed. Rep. of Germany ........ 53/182 R

Primary Examiner—Robert Louis Spruill
Attorney, Agent, or Firm—L. J. Pizzanelli; J. F. Verhoeven

[57] ABSTRACT

A packaging machine for making sealed packages with articles contained therein includes seal bars and anvils mounted for relative rotation along circular paths so that both the seal bars and the anvils maintain their orientation in space constant. Resilient mounting of the seal bars and anvils allows for extended contact time with a thermoplastics web which forms the packages. The seal bars and other parts of the machine may be driven by a common variable speed motor through a drive chain which maintains constant speed ratios between the operative parts. The accuracy of the sealing may be improved by clamps mounted on the seal bar assembly which cooperate with the anvils to hold the web while sealing and cutting take place. The seal bar assembly may include two seal bars, one of which cuts and seals to form an edge of a package and also forms a handle cut-out and the other seal bar forms a transverse seal to seal off a main portion of the bag from a handle cut-out portion.

3 Claims, 16 Drawing Figures

PACKAGING MACHINE

BACKGROUND OF THE INVENTION

1. Field of the Invention

This invention relates to packaging machines.

2. Description of the Prior Art.

Previously proposed packaging machines that form a "pillow" package include many features that principally result from the article packaged, the nature of the thermoplastics web material, variations in product height and length, production rates and shelf life. Certain web material, such as polyethylene and laminates, require higher temperatures and more time to produce an adequate seal.

It is sometimes required that elongate packages, for example for packaging shirts, should have a carrying handle cut-out but that the merchandise should not thereby be open to atmospheric dirt. Packaging machines in accordance with the invention can be employed to produce packages which meet these requirements.

SUMMARY OF THE INVENTION

According to the present invention there is provided in a packaging machine a sealing and cutting head including parts movable relatively to one another to effect sealing and cutting of a plastics web and means mounting said parts for circular motion with operative faces of the parts always facing one another.

Further according to the present invention there is provided in a packaging machine two opposed seal bar assemblies for sealing a thermoplastics web, means mounting the assemblies and means for driving each of the assemblies on a respective circular path with the assemblies maintaining a constant orientation with respect to one another throughout the cycle of operation.

Still further according to the present invention there is provided in a packaging machine means for moving a web of thermoplastics material past a sealing and cutting station, means for placing a succession of articles to be packaged in the web, means for cutting and sealing the web upstream and downstream of each article to form an individual package including opposed cooperating parts and means for moving parts of the sealing and cutting means so that the opposed parts arranged to contact the web maintain a constant orientation during execution of a circular path of movement between each sealing operation and so that sealing contact of the web with the cutting and sealing means is maintained for a period longer than would occur with simple line contact of the sealing means and the web.

Yet further according to the present invention there is provided a packaging machine comprising an infeed conveyor, sealing wheels, a transverse sealing head and variable speed drive means for driving the conveyor, the wheels and the head at constant speed ratios.

Yet further according to the present invention there is provided a seal bar assembly for incorporation in a packaging machine suitable for forming packages with an article in each package, said assembly comprising transverse seal bar beams and clamping means disposed upstream and downstream of the seal bar means, said clamping means serving to clamp a web of thermoplastics material while the seal bar means effect sealing of the web.

Yet further according to the present invention there is provided a seal bar assembly for sealing and severing the individual packages and lengths of thermoplastics web, said assembly comprising seal bar means, anvil means arranged to cooperate with the seal bar means, clamping means disposed upstream and downstream of the seal bar means and associated both with the seal bar means and the anvil means, and a drive arrangement mounting the seal bar means, the clamping means and the anvil means, the mounting being such that the seal bar means, the clamping means and the anvil means maintain the same relative orientations throughout the cycle of operation.

BRIEF DESCRIPTION OF THE DRAWINGS

The invention will now be described, by way of example, with reference to the accompanying diagrammatic drawings, in which.

DESCRIPTION OF THE PREFERRED EMBODIMENT

Figure 1:
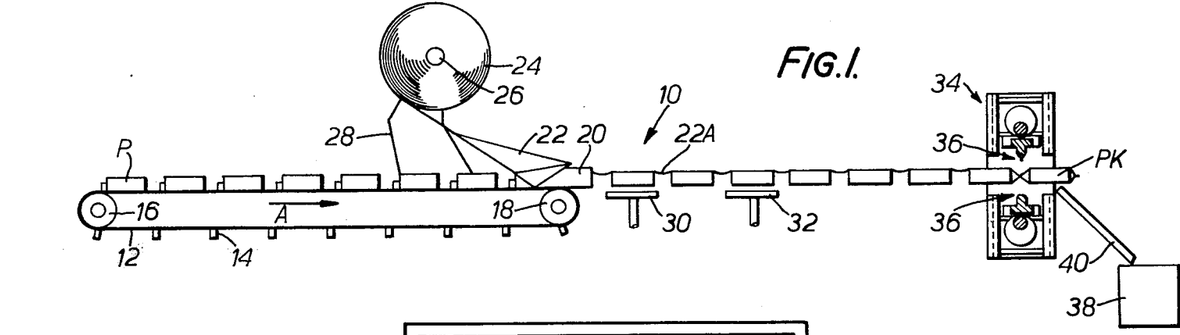
FIG. 1 is a diagrammatic side elevation of one embodiment of a packaging machine in accordance with the present invention.

Referring to FIGS. 1 to 9, the packaging machine illustrated is of the horizontal form, fill and seal type and is identified generally by the numeral 10 in FIG. 1. Articles to be packaged P are carried by a conveyor 12 which includes a plurality of regularly-spaced lugs 14 whose spacing determines the spacing of the articles. The conveyor is mounted for movement around a rear and a forward pulley, respectively, 16 and 18 with the pulley 18 being driven by a drive train (FIG. 9) to operate the upper run of the conveyor 12 in the direction of arrow A. As the articles advance, they are fed into a web forming box 20 operating to form web material 22, derived from a roll 24 mounted on a shaft 26 of an unwind stand 28, into a tubular configuration, thereby depositing each article into the formed web tube 22A. The lateral edges of the web tube are folded downwardly by the forming box 20 and are received between heated, longitudinally-spaced, pairs of sealing wheels 30 and 32. As an alternative, one pair of sealing wheels, such as 30, may be provided whereas the other pair of wheels such as 32 may have a configuration to effect folding of the downwardly-extending longitudinal edges laterally and upwardly toward the web tube 22A. The entubed articles progress to a transverse sealing and cutting head 34 which includes a sealing and cutting bar assembly 36 operating simultaneously to move the sealing and cutting bars towards and away from the web tube to make pressure engagement therewith between the articles and thereby hermetically encapsulate each article in a web tube portion. Packages PK are produced and are directed to a container 38 by chute 40.

One aspect of the present invention concerns the sealing and cutting head 34 which is provided with a simplified and versatile drive train that allows a greater range of article dimensions (height to length) and yet when sealing of the web occurs an equal or substantially equal speed match between the web and the sealing bars exist. The seal bar drive translates the sealing and cutting bar assembly 36 in circular paths above and below the web tube 22A and the web-engaging surfaces of the seal bars face each other throughout the cycle of operation. This mode of operation permits closer spacing between the entubed articles since the sealing and cutting bars on approaching sealing and on withdrawing from the web tube present the narrowest dimension (the width of the sealing bars) to the zones of the web between the articles.

To achieve this result, the preferred embodiment comprises a seal bar actuating mechanism comprising seal bar mounting means which are operative simultaneously to translate the seal bars in horizontal and vertical directions (hereinafter for convenience sometimes referred to as X and Y directions, respectively) by incorporating camactuated members which are relatively movable in a verticle direction.

Figure 2:
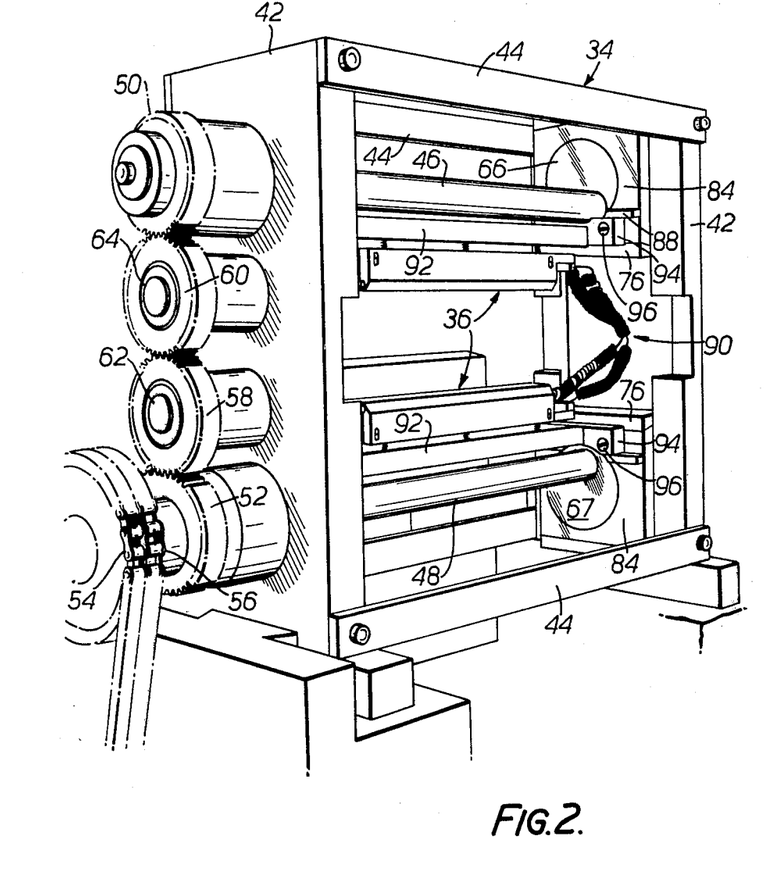
FIG. 2 is a perspective view of a cutting and sealing head of the machine of FIG. 1.

Referring to FIG. 2, the head comprises vertical, laterally-spaced, side frame members 42 interconnected by upper and lower beams 44. The side frame members 42 rotatably support upper and lower transverse drive shafts 46 and 48 on one end of which are keyed respectively gears 50 and 52. The shaft 48 constitutes the power input shaft since it is connected to the drive train of the machine (FIG. 9) by a sprocket chain 54 which drives a sprocket 56 also keyed to the shaft 48. The shaft 48 is interconnected to the shaft 46 by means of gears 58 and 60 which are rotatably mounted on short stub shafts 62 and 64.

Each of the shafts 46 and 48 has secured thereon a flat circular plate 66, 67. As will be noted, the centers of the plates 66, 67 are eccentric to the axes of the shafts 46 and 48 and thereby function as cams as will be presently explained.

Figure 7:
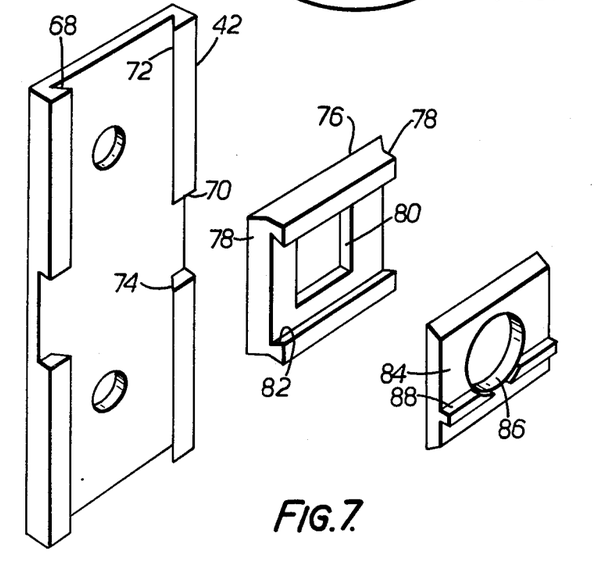
FIG. 7 is an exploded perspective view of one side frame of the head.

As shown in FIG. 7 each side frame member 42 has a vertically-extending dovetail slot 68 divided by a horizontally-extending, rectangular section slot 70, into upper and lower portions 72, 74. Each portion 72, 74 accommodates one of two generally rectangular blocks 76 each having dovetail portions 78 so that the blocks are slidable in the respective portions of the slot 72, 74.

An aperture 80 is provided in each block 76 and its size is sufficient not only to allow the passage of the shaft 46 but to avoid interference therewith. Each block 76 is also formed with a dovetail slot 82 normal to the dovetail slot 68 for slidably receiving a further, smaller, block 84 having an aperture 86 slidably receiving one of the plates 66. Ears 88, formed on each block 84, provide locating surfaces for a seal-bar supporting beam.

Figures 4, 5:
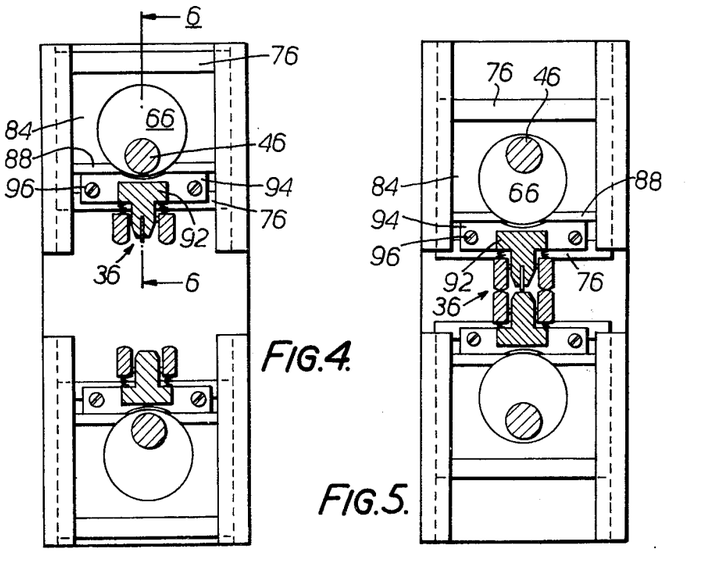
FIG. 4 is a fragmentary side elevation of a portion of the head illustrating in greater detail a drive arrangement for the sealing and cutter bar assembly.
FIG. 5 is an elevation similar to FIG. 4 but showing moveable parts in different relative positions.

According to the above construction, and with reference to FIGS. 2, 4 and 5 which show the transverse sealing and cutting head 34 at various stages of actuation, the following mode of operation is revealed. FIGS. 2 and 4 show the seal bars 36 at their most widely separated position. The blocks 76 of both side frame members 42 are spaced apart at their maximum distance while each of the smaller blocks 84 is centered with respect to the corresponding block 76. As the shafts 46 and 48 rotate from the position shown in FIG. 4 to the position of FIG. 5 the seal bars 36 move toward each other, and relative movement occurs between the blocks 76 and 84. At the same time the blocks 76 slide towards each other in the dovetail 68. As the shafts 46, 48 rotate, the eccentric circular plates 66 cause simultaneous movement of all the blocks 76 (downwardly for the upper seal bar and upwardly for the lower seal bar) and the smaller blocks 84 move horizontally. When the seal bars 36 are in pressure contact (FIG. 5) to cut and seal the web, the blocks 76 have moved towards each other and the blocks 84 are centered with respect to the blocks 76.

Figures 6, 8:
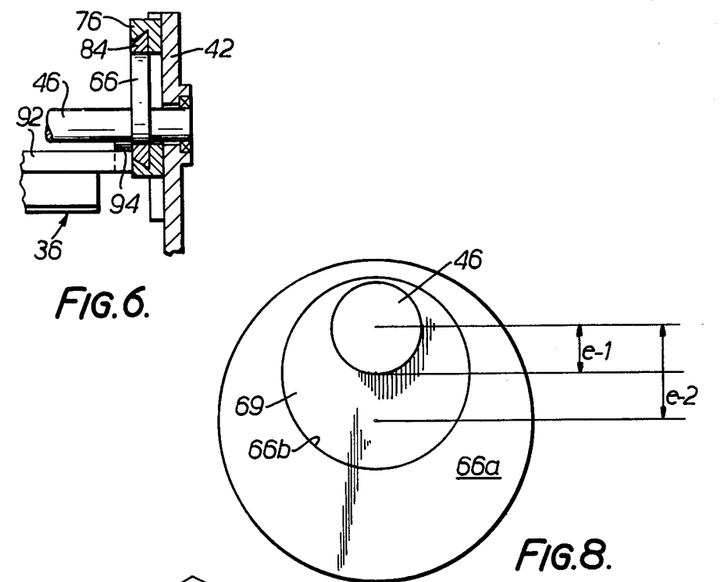
FIG. 6 is a fragmentary transverse section of FIG. 4 taken substantially along the line 6—6.
FIG. 8 shows an end elevation of the driving cam.

FIG. 8 shows a preferred construction of the seal bar driving eccentrics. Each plate eccentric or cam, 66, 67 here indicated as 66a, is eccentrically bored at 66b to slidably receive an eccentric 69 which is adjustably fixed to the shaft 46. As shown, the relative position of eccentrics 66a and 69 is such that an eccentricity equal to the dimension e−2 results and this is the maximum eccentricity attainable. The minimum eccentricity results when the eccentric 67 is rotated through 180° thus producing an eccentricity of e−1. The relative position of the eccentrics 66a and 69 can be fixed by set screws or the like.

Thus according to the hereinbefore described construction and its mode of operation it will be appreciated that the upper and lower seal bars maintain a constant orientation and accordingly the web-engaging faces of the seal bars or jaws always face each other. As a result, the seal bars approach and engage the web tube between the longitudinally spaced articles P in an orientation which requires a minimum spacing between the individual articles.

Referring to FIGS. 2, 3, 4 and 5, but with particular reference to FIG. 2, it will be observed that the sealing and cutting bars assemblies comprise beams 92 having each end integral with short transverse plates 94. The plates 94 are seated against the projecting ears 88 and are secured to the blocks 84 by fasteners 96. A cooperating cutting knive and anvil 98 and 100, respectively, project from the beams 92. The beams also mount, by means of fasteners 102, heated seal bars 104. Opposed pairs of the seal bars 104 are biased toward each other by compression springs 106 and reciprocate relative to the knife 98 and the anvil 100 since the fasteners 102 lie in elongate slots 108 formed in the seal bars.

Figure 3:
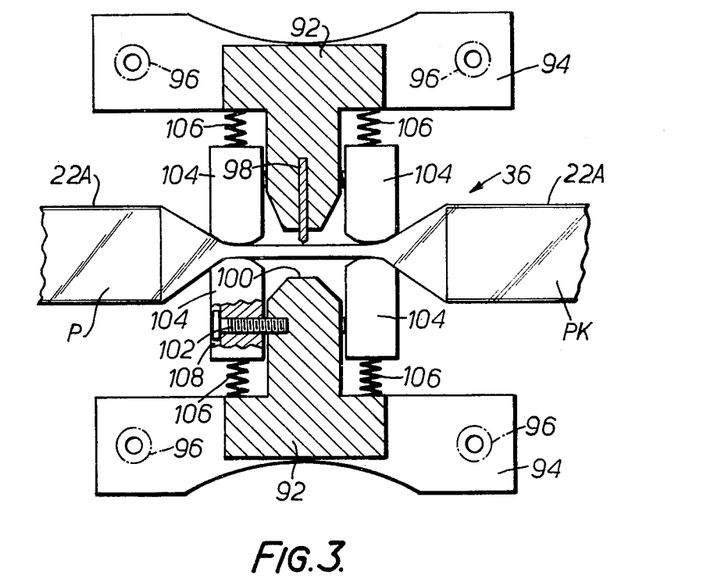
FIG. 3 is a transverse section, to an enlarged scale, of the sealing and cutting assembly of the machine.

FIG. 3 shows the sealing and cutting assembly 36 in the process of sealing and severing the web tube 22A between an article to be packaged P and a formed package PK. At this stage preheating of the web tube sealing zones is in progress and as the upper and lower seal bars 104 come into pressure engagement with the upper and lower web surfaces, the web is sealed and the web tube is immediately cut by the action of the knife 98 against the anvil 100. It will be appreciated that the sealing bars 104 are in contact with the web tube 22A for an extended period which is necessary for properly sealing polyethylene and certain laminate structures.

Operating the transverse sealing and severing jaws 36 so that their orientation is not changed during their actuation simplifies connecting the seal bar heating elements to a source of electrical power. In certain previously proposed constructions wherein the seal bars are rigid with a rotary shaft, connection of the seal bar heaters involves the use of slip rings and brushes which are not substantially more expensive but maintenance thereof, to the extent that proper operation requires cleaning for good electrical contact, must be done frequently. The seal bar heaters of this embodiment are connected to a power source by electrical leads 90 extending through an aperture in one of the side frames 42. The lead portions connected to the seal bar heaters are helical to allow extension when the seal bars 36 are widely separated as shown in FIG. 2.

Figure 9:
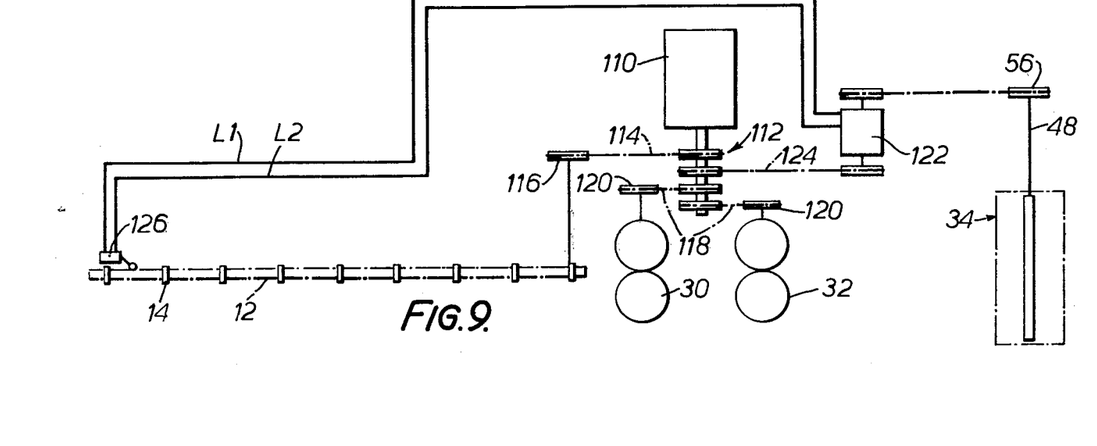
FIG. 9 is a diagram of a drive train which, in the embodiment of FIGS. 1 to 8 includes an electrically operated clutch-brake.
Figure 10:
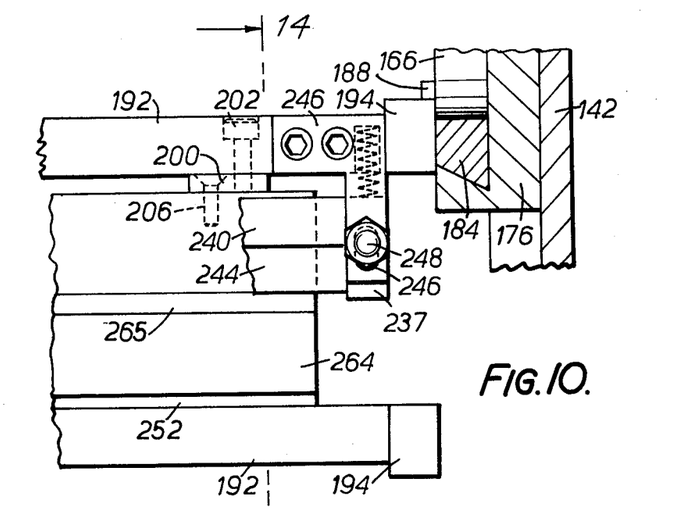
FIG. 10 is an enlarged partial side elevation of a sealing and cutting assembly of a second embodiment.
Figure 11:
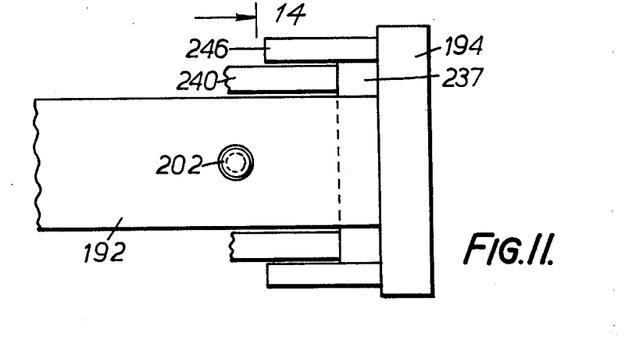
FIG. 11 is a fragmentary plan view of an upper part of the assembly of FIG. 10.
Figure 12:
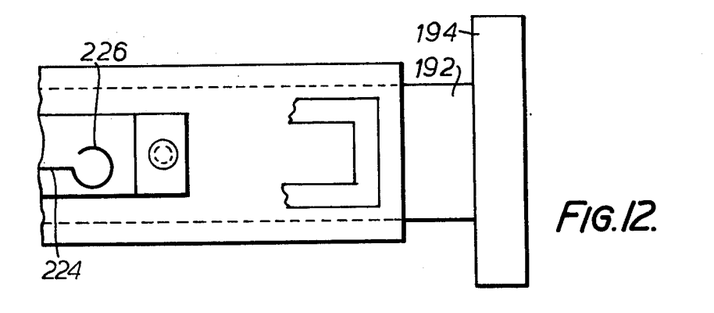
FIG. 12 is a fragmentary plan view of a lower part of the assembly of FIG. 10.
Figure 13:
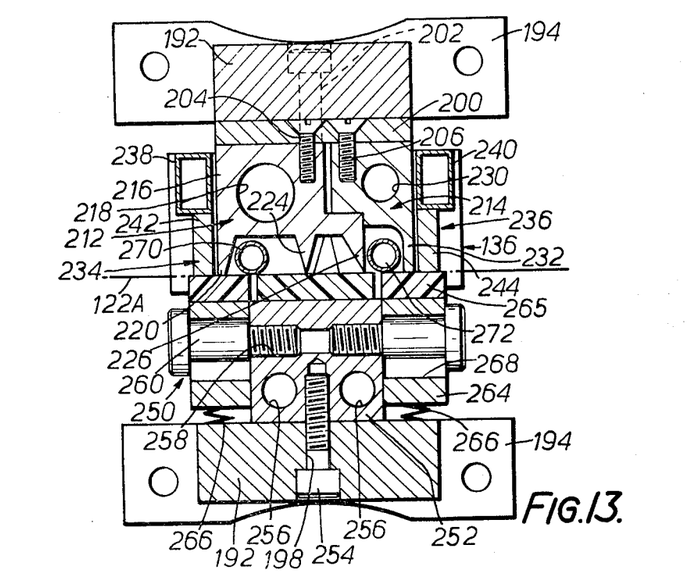
FIG. 13 is a mid cross-section of the assembly as shown in FIG. 10.
Figure 14:
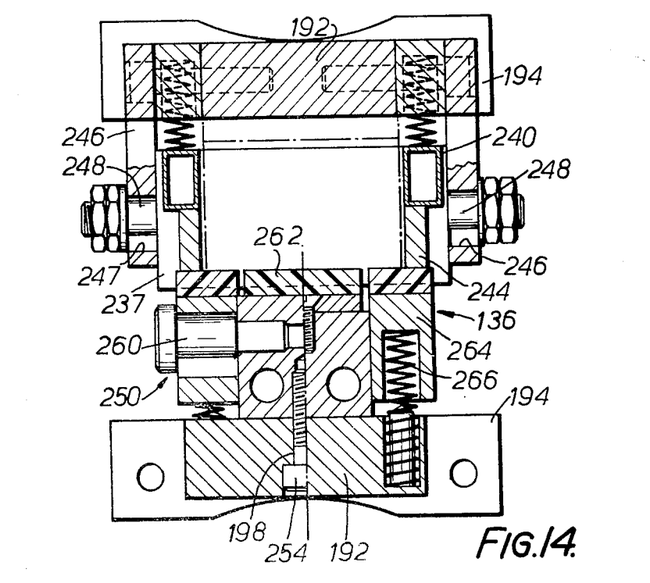
FIG. 14 is a cross-section generally along the line 14—14 of the assembly shown in FIG. 10.

The drive for the machine is illustrated in FIG. 9. A conventional DC motor 110, associated with speed controlling devices carries on its output shaft, a plurality of sprockets 112 and these drive the conveyor 12 by means of a sprocket chain 114, a sprocket 116 and the pulley 18. The longitudinal sealing wheels 30 and 32 are driven by sprocket chains 118 and sprockets 120. The drive to the transverse cutting and sealing head 34, (broken lines in FIG. 9) includes a clutch-brake assembly 122 with an input driven by a sprocket chain 124 and one of the sprockets 112. Electrical power is supplied to the clutch-brake assembly by leads L1 and L2. One of the leads (lead L2) is connected to a limit switch 126 which operates sequentially to connect and disconnect the clutch-brake assembly 122 from the power source. The limit switch 126 is operated by the lugs 14.

The drive train ensures that all operative elements such as the conveyor 12, sealing wheels 30 and 32 and the head 34 operate at all times at a fixed speed ratio which will be maintained irrespective of the adjusted speed of the D.C. motor 110. When articles of a certain length are being packaged, for example, packages of 15 or 16 centimeters, the clutch-brake assembly 122 can be eliminated and thus the drive sprocket 56 is directly connected to output shaft of the motor 110. However, product lengths which are shorter or longer than a nominal size require synchronization of the transverse sealing and cutting head 34. To illustrate, a packaging article having a length of 25 centimeters would require setting the lugs 14 to be spaced apart sufficiently to handle that length. Each time one of the lugs 14 encounters the limit switch 126, the clutch-brake assembly 122 is energized and thus drive is imparted to the sprocket 56 which causes the head 36 to seal and cut the web tube.

As a result of the manner in which the sealing and cutting jaws operate, it is possible to package an article having a greater ratio of height to length. One example will illustrate this ability. Considering the eccentricity between the axes of the shafts 46 and 48 to the axes of the circular plates 66, 67 to be 25 millimeters. A circle of 50 millimeters will be described by cutting and sealing bar assembly 36. The total distance between the jaws comprising the knife 98 and anvil 100 when fully opened is equal to 100 millimeters, thus an article of this height can be processed. At the same time with an eccentricity of 25 millimeters, an article having a length of 150 to 160 millimeters ($2 \times R \times \pi$) can be processed.

A transverse sealing and cutting head of conventional design viz., radially extending sealing jaws rigidly connected to a rotating shaft, cannot be made in such small diameters, but to handle an article of 100 millimeters in height a head diameter of approximately 140 millimeters would be required. The corresponding length of the article would be 440 millimeters with a one-up head and 200 millimeters with a two-up head.

Another advantage resulting from maintaining the orientation of the sealing and cutting jaws fixed is that on approaching and pressing the web tube for sealing and cutting, the sealing jaws remain in contact with the thermoplastics web for a slightly longer period than for a conventional sealing head. Longer sealing time is advantageous for films such as polyethylene and certain laminates which require more heat to effect an acceptable seal.

Referring now to FIGS. 10 to 14, the seal bar assembly corresponds in overall purpose to the assembly of the first embodiment illustrated in FIG. 3. For convenience, certain of the basic parts are given reference numerals corresponding to those of the first embodiment but with the addition of "100". The seal bar assembly of the second embodiment is intended to produce carrier bags with handle grip slots, or bags incorporating an article and having a terminal portion incorporating a handle grip cut-out which portion is sealed-off from the article.

The sealing and cutting bars are generally indicated by the reference numeral 136 and both include beams 192, each end of each beam being rigid with a plate 194 extending transversely to the beam.

As in the seal bar assembly of the first embodiment, the plates 194 are seated against projecting ears 88 as shown in FIGS. 2 and 7 and the fixing of the plates 194 to the ears 88 is generally similar. The plates 194 are secured to an eccentric 166 which in turn is supported in a small block 184 and a block 176 which is carried by a side frame 142. The path of the web to be sealed through the assembly is indicated by reference 122a.

The beams, both upper and lower, 192 have a plurality of countersunk bores 198 (FIG. 13) spaced across them (only one shown) and the upper beam carries to spacers 200, one at the left-hand and one at the right-hand end portions of the beam and each of these spacers 200 has a tapped bore arranged to receive an end portion of a bolt 202 (FIG. 10) screwed into the upper beam and to carry in two countersunk bores 204 further bolts 206 which are screwed into tapped bores in first and second seal bar sub-assemblies 212, 214.

Figure 15:
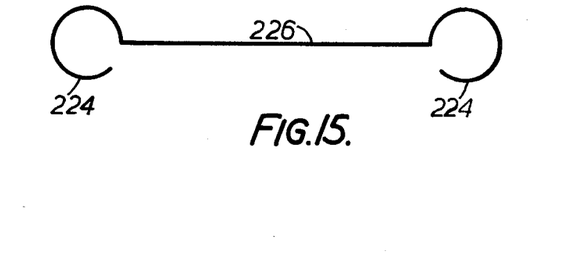
FIG. 15 illustrates the shape of the cutting edge of one bar of the cutting and sealing bar assembly.

The first seal bar 212 comprises an elongate bar 216 having a generally rectangular section part with a passage 218 for a heater element extending longitudinally thereof and a dependent integral part carrying three ridges or projections 220, 224 and 226. As illustrated in the drawings the left-hand projection 220 is of rounded cross-section at its tip while the center projection 224 has a cross-section in the form of an isosceles triangle having a sharp lower edge whereas the right-hand projection 226 has a section in the form of a right-angled triangle with a 30° apex angle. The projection 224 effectively forms a continuation of the projection 226, the projection 224 being arcuate with the same radius as an end portion of the projection 226. A similar continuation (not shown in FIG. 14) is provided at the other end of the projection 226 and the combined shape of projections 224 and 226 is illustrated in FIG. 15.

The two projections 224, 226 together extend only over a central portion of the seal bar 212 corresponding to the width of a handle cut-out in the web 122A. The projection 220, however, extends over the whole length of the seal bar and serves to seal and cut the web to form separate bags, or packages.

The second seal bar 214 again has a generally rectangular section body with a circular section passage 230 for a heater element extending longitudinally thereof and a dependent portion having a rectangular section elongate projection 232 the lower face of which lies on the web path 122A. The projection 232 has the same cross-section over its whole length and serves to seal off the part of the bag or package which contains an article or articles from the part of the package in which the handle cut-out is formed.

Laterally of each seal bar 212, 214 (considered in cross-section) two separate clamp bar assemblies 234, 236, are disposed each of which is rigid with a rectangular section pipe 238, 240 for cooling water and which includes a clamp bar 242, 244 of rectangular section the lower face of which lies, in the operative position, on the web path 122A. The clamp bar assemblies 234, 236 are interconnected by a bridge member 237 (FIG. 14) and end portions of the bridge member are carried by L-shaped brackets 246 attached to the clamps bars 242, 244 by bolts.

A part of the seal bar assembly 136 which provides an anvil for the clamp bars 234, 236 and the projections or ridges 220, 224, 226 and 232 of the individual seal bars will now be described. The anvil assembly 250 includes a central block 252 supported on the lower beam 192 by means of bolts 254 extending into the countersunk apertures 198 of the beam and into tapped apertures in the block 252. Two longitudinally-extending water cooling passages 256 are provided in the lower part of the block and a central part of the block has two horizontally-extending transverse tapped bores 258 receiving end portions of stepped bolts 260 while the upper face of the block supports a PTFE (Polytetrafluoethylene) anvil member 262 which cooperates, in operation, with the central and right-hand projections 224, 226 of the first seal bar 212.

The block 252 lies between two independently adjustable anvil assemblies 264 both of which are supported from the beam 192 through the intermediary of springs 266. PTFE strips 265 are secured to the upper surface of each assembly 264. The springs 266 extend into recesses both in the lower beam 192 and in each of the anvil assemblies 264 themselves. The two bolts 260 have non-screwed portions which pass through elongate vertical slots 268 in each of the outer anvil assemblies 250 thus enabling adjustment of the three anvil assemblies indpendently of one another.

The space between the left-hand and central projections 220, 224 of the first seal beam 212 accommodates a pipe 270 carrying a supply of colling water and a space defined between the right-hand projection of the second seal bar and the right-hand projection 226 of the first seal bar 212 also accommodates a cooling water pipe 272.

In operation, the web moves along the web path 122A and each seal bar assembly makes cyclic movements so that both always maintain the same orientation in space as in the first described embodiment, and the structure for achieving this is the same. At the time of sealing, the projections 220, 224, 226 and 232 of the upper seal bars and the corresponding anvils are always in contact through the web material and this contact is maintained as the respective assemblies move along the web path 122A in order to give sufficient time to enable the material to be fully sealed and severed whatever the material used.

The adjustment is such that the outer anvil assemblies 264 and the clamp members 234 and 236 come into operation initially to hold the web firmly while the seal bar projections, and in particular the central projection 224, come into contact with the web shortly thereafter. The integral projections 224 and 226 of the first seal bar assembly serve to sever the web by heat action to form a hand-grip slot while welding of the individual packages to form transverse seams is effected by the rounded seal bar projections 220 at the left-hand end of the first seal bar 212 and the sole projection 232 of the second seal bar 214 serves to seal the part of the package which contains an article from the part of the package with the handle cut out. The projection 220 also severs the web to form an individual package.

To accommodate different web materials various pressures can be applied by changing the springs 266 which lie between the independently movable anvil assemblies 264 and the lower beam 192.

By clamping the film with the aid of the clamping bars any risk of relative movement during the sealing operation is prevented and cooling is provided by the pipes 272 in order to avoid distortion of the web film during sealing.

The provision of cooling passages in the seal bar assemblies ensures that sagging distortion over a long period of use is avoided and the pipes 272 assist in keeping the web 122A cool particularly if it is a polyethylene film which is sensitive to excessive heat.

Figure 16:
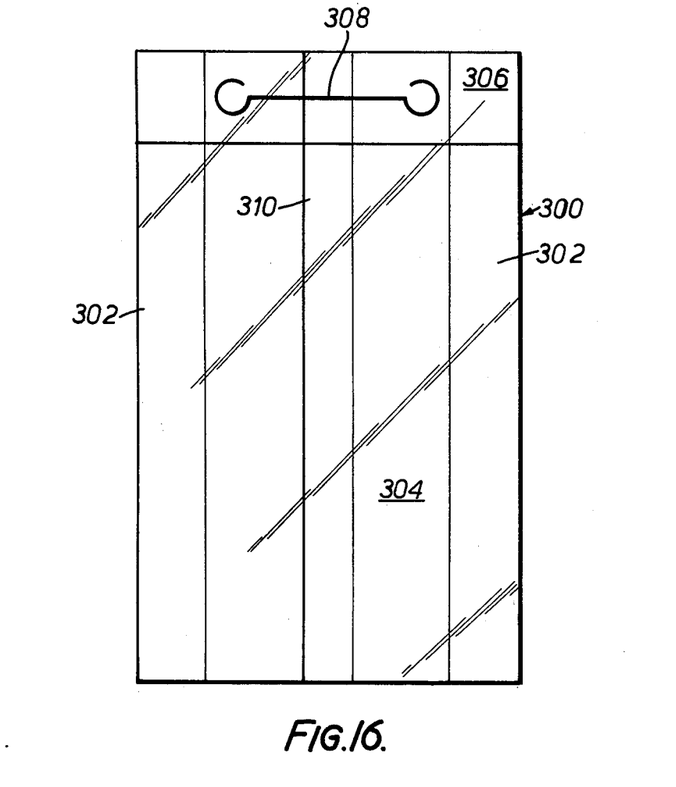
FIG. 16 is a plan view of a package made by the seal bar assembly of the second embodiment.

A bag of polyethylene manufactured by a machine incorporating a seal bar assembly of the second assembly is illustrated in FIG. 16.

The bag 300 is generally rectangular with gussetted longitudinal edges 302, an article-carrying portion 304 and a portion 306 having a handle cut-out 308. If desired the bag need not be hermetically sealed, the closure being formed merely by an overlapping edge portion 310 of the original tube.

Such a bag can be formed from a web of thermoplastics material as in the first embodiment but it will be necessary to add a gussetting attachment, known per se, between the web forming box 20 and the sealing wheels 30. The latter may be modified so that no actual sealing is effected but the edge portion 310 is properly placed in overlapping relationship.

Although the best mode contemplated for carrying out the present invention has been herein shown and described, it will be apparent that modification and variation may be made without departing from what is regarded to be the subject matter of the invention as defined in the appended claims.

I claim:

1. In a horizontal form, fill and seal packaging machine comprising an article infeed conveyor provided with equally spaced article feeding lugs, a frame rotatably supporting at least one roll of thermoplastic web material, means for forming the web into a tube as the web is unwound from said roll, said infeed conveyor being operative to introduce said articles in the web tube in spaced relation to create unoccupied web portions, means, simultaneously engaging opposite sides of said web tube at said unoccupied portions, for transversely severing and sealing each article in a web tube portion; said sealing and severing means including oppositely rotating transverse shafts located above and below the path of the web tube; means for synchronously rotating said shafts; means for mounting said sealing and severing means and responsive to the rotation of said shafts for continuously and concurrently moving said sealing and severing means along circular paths while the orientation thereof is maintained constant, said mounting means comprising opposed frame members on opposite sides of the web tube path, including upper and lower paired, vertically reciprocable blocks and horizontally reciprocable blocks, for accommodating motion of said sealing and severing means in said circular paths; one of each pair of reciprocable blocks being slidably mounted in an associated frame member with the other reciprocable block of each pair being slidably mounted in said one reciprocable block of the pair and for motion at 90° to the reciprocating motion of said one block, said transverse shafts being provided with eccentrics rotatably received by said other reciprocable block of each pair, said sealing and severing means being mounted to said other reciprocable block of each pair whereupon, in response to the rotation of said transverse shafts, said blocks are continuously and concurrently reciprocated in their respective vertical and horizontal directions, to describe said circular paths; and means resiliently mounting said sealing severing means; the radius of said circular paths being of a length so that they intersect as said sealing and severing means approach and recede from the web tube; said resilient means being operative, on initial pressure engagement with the opposite sides of said web tube, to constrain the sealing and severing means to describe a linear path between the points at which said circular paths intersect and thus effect prolongation of the time in which said sealing and severing means maintain engagement with the web tube.

2. A packaging machine according to claim 1 wherein the severing and sealing means comprises an upper and a lower assembly, each assembly comprising an upstream and a downstream sealing bar and a severing knife lying intermediate the seal bars.

3. In a packaging machine of the type forming pillow packages from a strip of thermoplastic web material being continually formed into a tube in which a single file of regularly spaced articles supplied by an infeed conveyor are introduced, the article laden tube being thereafter transversely severed and sealed by means of opposed heated seal bars and cooperating knife and anvil engaging the tube at the unoccupied portions to thereby produce such packages, the improvement in the means for operating the transverse severing and sealing comprising laterally aligned frame members located on either side of the path of the tube, elongate vertical guide slots in the facing surfaces of said members, a pair of rectangular blocks slidably mounted in each of said frame members, said blocks being positioned in each frame so that one block is above and the other below the path of the web tube, each of said blocks being formed with a guide slot being normal to the guide slots in said frame members, another rectangular block slidably mounted in the guide slot of each of said first mentioned blocks and formed with a circular bore, transverse shafts having eccentric circular discs fixed adjacent each end and being rotatably mounted in said frame members, said discs being rotatably received in the circular bores of said second mentioned rectangular block, web tube severing and sealing means secured to said second mentioned rectangular blocks, and means for concurrently driving said shafts in opposite directions, whereupon driving of said shafts effects orbital movement of said sealing and severing means by imprinting simultaneous vertical and horizontal displacement, respectively, of said first mentioned blocks relative to said frame members and said second mentioned blocks relative to said first mentioned blocks.

* * * * *